United States Patent [19]
Taylor

[11] 3,892,741
[45] July 1, 1975

[54] PREPARATION OF THIOCARBAMYLSULFENAMIDES

[75] Inventor: Ray D. Taylor, Brecksville, Ohio

[73] Assignee: The B.F. Goodrich Company, Akron, Ohio

[22] Filed: May 18, 1972

[21] Appl. No.: 254,533

[52] U.S. Cl....260/246 B; 260/239 BF; 260/247.1 R; 260/247.1 T; 260/247.1 M; 260/293.63; 260/293.85; 260/326.82; 260/326.83; 260/465.8 R; 260/513.5; 260/551 S
[51] Int. Cl............................................. C07d 87/46
[58] Field of Search............. 260/247.1 (U.S. only), 260/ 239 BF, 326.85, 326.83, 293.63, 551 S, 268 S, 513.5, 246.3

[56] References Cited
UNITED STATES PATENTS

| | | | |
|---|---|---|---|
| 2,318,482 | 5/1943 | Hanslick | 260/567 |
| 2,381,392 | 8/1945 | Smith and Carr | 260/793 |
| 2,421,352 | 5/1947 | Paul et al. | 260/551 |
| 2,581,921 | 1/1952 | Alliger | 260/306.6 |
| 2,758,995 | 8/1956 | Sullivan | 260/247.1 |
| 2,776,297 | 1/1957 | Cherlow et al. | 260/306.6 |
| 3,178,428 | 4/1965 | Eaker et al. | 260/247.1 |
| 3,737,431 | 6/1973 | Campbell et al. | 260/247.1 T |

OTHER PUBLICATIONS

Veideman et al., Chemical Abstract, 63:237e, (1965).
Smith et al., Journal of Organic Chemistry, Vol. 14, 1949, pp. 935–945.

*Primary Examiner*—Donald G. Daus
*Assistant Examiner*—Jose Tovar
*Attorney, Agent, or Firm*—Alan A. Csontos

[57] ABSTRACT

Thiocarbamylsulfenamides are prepared in high yields in a process comprising the reaction of a monohaloamine with tri- or tetrathiocarbonate salt. The compounds have particular utility as accelerators in the vulcanization of unsaturated polymers.

11 Claims, No Drawings

PREPARATION OF THIOCARBAMYLSULFENAMIDES

BACKGROUND OF THE INVENTION

Several processes for the preparation of thiocarbamylsulfenamides are disclosed in *Journal of Organic Chemistry*, Vol. 14, (1949), Page 935. A dithiocarbamate metal salt is the starting material in each process. A widely used process is the reaction of a dithiocarbamate metal salt with an amine in the presence of an oxidizing agent. The oxidizing agents normally used are iodine in a potassium iodide solution, or sodium hypochlorite. If iodine is used, an excess is required to make up for losses due to iodate formation. If NaOCl is used, large molar excesses of amine to dithiocarbamate, 30/1 and over, are required to obtain high yields.

SUMMARY OF THE INVENTION

Thiocarbamylsulfenamides are prepared in a process comprising the reaction of monohaloamine(s) with a tri- or tetrathiocarbamate salt. Yields of over 60 percent and greater than 80 percent are readily obtained, even when employing little or no excess of reactants.

DETAILED DESCRIPTION

The thiocarbamyl sulfenamides prepared by the method of this invention have the formula $$A-\overset{\overset{S}{\|}}{C}S-A$$

wherein A is selected from the group consisting of

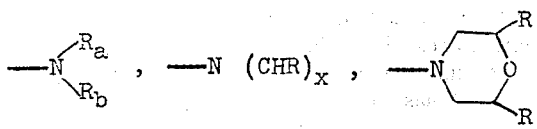

and mixtures thereof, where $R_a$ and $R_b$ are selected from the group consisting of hydrogen, an alkyl radical containing 1 to 24 carbon atoms, a cyanoalkyl radical containing 2 to 12 carbon atoms, an alkoxyalkyl radical and an alkylthioalkyl radical containing 2 to 12 carbon atoms, an alkylene radical containing 2 to 18 carbon atoms, all wherein the alkyl structure can contain secondary or tertiary carbon atom structures; a cycloalkyl radical containing 4 to 8 carbon atoms in the ring and additionally may have 1 to 4 carbon atom alkyl substituents thereon; an aryl, alkaryl, or aralkyl radical containing 6 to 18 carbon atoms in the radical; and where R is hydrogen or an alkyl radical containing 1 to 4 carbon atoms and $x = 2$ to 7.

Examples of such compounds are thiocarbamylsulfenamide and the derivatives thereof as N,N-dimethylthiocarbamylsulfenamide; N-methyl-N'-ethylthiocarbamylsulfenamide; N,N,N',N'-tetramethylthiocarbamylsulfenamide; N,N,N',N'-tetraethylthiocarbamylsulfenamide; N,N,N',N'-tetrabutylthiocarbamylsulfenamide; N-methyl-N',N'-diisopropylthiocarbamylsulfenamide; N-octyl-N'-butylthiocarbamylsulfenamide; N,N-didodecylthiocarbamylsulfenamide; N,N-di-octyldecylthiocarbamylsulfenamide; N-isopropyl-N',N'-dicyclobutylthiocarbamylsulfenamide; N-methyl-N-phenyl-N',N'-dimethylthiocarbamylsulfenamide; N,N-dimethyl-N'-tetramethylenethiocarbamylsulfenamide; N'-oxydiethylenethiocarbamylsulfenamide; N,N-dimethyl-N'-oxydiethylenethiocarbamylsulfenamide; N,N-di-(α-cyanopropyl)thiocarbamylsulfenamide; N,N,N',N'-tetramethoxyethylthiocarbamylsulfenamide; N,N-diallyl-N',N'-dimethylthiocarbamylsulfenamide; N,N-dibutyl-N',N'-dicyclohexylthiocarbamylsulfenamide; N-cyclooctyl-N',N'-(1,3-dimethylhexyl)thiocarbamylsulfenamide; N-benzyl-N',N'-diethylthiocarbamylsulfenamide; N-pentamethylene-N',N'-dipropylthiocarbamylsulfenamide; N,N'-di-(tetramethylene)thiocarbamylsulfenamide; N,N'-di-(pentamethylene)thiocarbamylsulfenamide; N,N'-di-(hexamethylene)thiocarbamylsulfenamide; N-pentamethylene-N'-oxydiethylenethiocarbamylsulfenamide; N-heptamethylene-N'-oxydiethylenethiocarbamylsulfenamide; N,N'-di-(oxydiethylene)thiocarbamylsulfenamide; N-oxydiethylene-N'-2,6-dimethyloxydiethylenethiocarbamylsulfenamide; N,N'-di-(2,6-dimethyloxydiethylene)thiocarbamylsulfenamide; and N-2,6-dimethyloxydiethylene-N'-ethylthiocarbamylsulfenamide.

The thiocarbamylsulfenamides are prepared by the reaction of a monohaloamine or mixtures thereof with a thiocarbonate salt.

The monohaloamines have the formula X—A wherein X is —Cl, —Br, and —I, and A is as defined above.

Examples of monohaloamines are monochloroamine, monobromoamine, methyl-chloroamine, ethyl-chloroamine, ethyl-iodoamine, hexyl-chloroamine, dodecyl-chloroamine, dimethyl-chloroamine, dimethyl-bromoamine, diethyl-chloroamine, ethyl-propyl-chloroamine, diisopropyl-chloroamine, ethyl-hexyl-chloroamine, dioctyl-chloroamine, dioctyl-bromoamine, didodecylchloroamine, dioctadecyl-chloroamine, diallyl-chloroamine, α-cyanopropyl-chloroamine, methylthioethyl-chloroamine, dimethylthioethyl-iodoamine, di-methoxy-ethyl-chloroamine, phenylchloroamine, benzyl-chloroamine, benzyl-bromoamine, 3,5-ethylbenzyl-chloroamine, cyclopentyl-chloroamine, cyclohexyl-chloroamine, dicyclobutyl-chloroamine, dicyclohexyl-bromoamine, tetramethyleneamine chloride, heptamethyleneamine chloride, hexamethyleneamine chloride, hexamethyleneamine iodide, 4-methylhexamethyleneamine chloride, oxydiethyleneamine chloride, 2,6-dimethyloxydiethyleneamine chloride, and the like.

The monochloroamines are preferred. They are readily prepared by reacting a primary or secondary amine with a chlorinating agent such as sodium hypochlorite, NaOCl. This can be done in situ prior to the reaction of the chloro-amine with the thiocarbonate salt. Reference will be made to the monochloroamines as used in the process, though it is understood that monobromoamines and monoiodoamines may be used.

More preferred are those amines wherein when A is $-NR_aR_b$, $R_a$ and $R_b$ are hydrogen or alkyl radicals containing 1 to 24 carbon atoms; and when A is

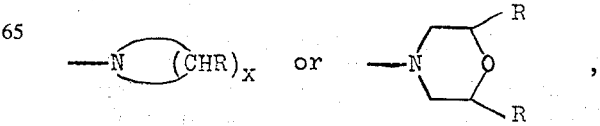

$x$ is 3 to 7 and R is hydrogen or a methyl or ethyl radical. Examples of such compounds are monochloroamine, methyl-chloroamine, ethyl-chloroamine, hexyl-chloroamine, dimethyl-chloroamine, diethyl-chloroamine, ethyl-propyl-chloroamine, dibutyl-chloroamine, dihexyl-chloroamine, hexyl-octyl-chloroamine, diisooctyl-chloroamine, didecyl-chloroamine, methyl-dodecylchloroamine, ditetradecyl-chloroamine, dioctadecyl-chloroamine, tetramethyleneamine chloride, pentamethyleneamine chloride, hexamethyleneamine chloride, oxydiethyleneamine chloride, 2,6-dimethyloxydiethyleneamine chloride, and the like.

The thiocarbonate salt employed has the formula $M_zCS_y$ wherein M is an alkali metal such as Na, K, Li, and the like; an alkaline earth metal such as Ca, Ba, and the like; an ammonium salt of the structure $—N(R')_4$ wherein R' is —H or an alkyl radical containing 1 to 8 carbon atoms, or mixtures thereof; $z = 1$ to 2 depending upon the valency of M; and $y$ is 3 or 4. More preferably M is an alkali metal such as Na and K, and most preferably M is Na. The sodium trithiocarbonate salt is readily prepared by reacting sodium sulfide, $Na_2S$, with carbon disulfide, $CS_2$. The sodium tetrathiocarbonate salt is readily prepared by reacting $Na_2S$ with sulfur, followed by the addition of $CS_2$.

The thiocarbamylsulfenamide is prepared by reacting monochloroamine with the tri- or tetrathiocarbonate salt. The monochloroamine can be of one type in which case a symmetrical compound is prepared, or two or more types of monochloroamine can be used in which case a mixture of thiocarbamylsulfenamides is produced that includes unsymmetrical compounds. When viewed on the basis of yield of a desired compound, the process of this invention lends itself more readily to the production of symmetrical thiocarbamylsulfenamides.

The monochloroamine(s) can be reacted with the thiocarbonate salt in a suspension in water. The thiocarbonate salt is dissolved in water, the monochloroamine(s) added, and the mixture agitated. Neither the chloroamine(s) nor the thiocarbamylsulfenamide is soluble in water. When agitation stops, the mixture separates and the chloroamine(s)/product phase is separated out. The thiocarbamylsulfenamide can be isolated by evaporating off the chloroamine(s) under reduced pressure.

A more preferred variation is to conduct the reaction in an aqueous/non-aqueous medium. In this manner, higher yields and more pure products can be obtained. The medium consists of water and an organic solvent, preferably a chlorinated organic solvent such as carbon tetrachloride, chloroform, ethylene dichloride, 1,1,2-trichloroethane and the like. The monochloroamine(s) and the dithiocarbamylsulfenamide are both soluble in the non-aqueous phase.

The temperature of the reaction ranges from near the freezing point of the mixture, about $-20°C.$, to near the boiling point of the mixture, about $80°-100°C.$ A more preferred range is from about $-10°C.$ to about $40°C.$ Reaction times are from about 0.2 hour to about 2 hours.

The monochloroamine(s) can be used in a molar excess of the amount of the thiocarbonate salt present. However, yields of over 60% and in excess of 80% based on the theoretical yield are readily obtained using essentially two moles of monochloroamine to every one mole of tri- or tetrathiocarbonate present.

By-products of the reaction are the metal halide and sulfur.

The reaction is conducted with agitation. After the reaction, the mixture is allowed to separate and the non-aqueous phase is decanted off and dried down to isolate the product. The thiocarbamylsulfenamides are usually crystalline materials but some are liquids at room temperatures. The product can be dissolved in an alcohol such as methanol and ethanol or in an alkane such as hexane, and then precipitated out by cooling. Yields after recrystallization are about 40% to about 80% of the theoretical yield. The compounds can be characterized by melting point, infra-red (IR) spectra, nuclear magnetic resonance (NMR), and carbon/hydrogen/nitrogen analysis.

The thiocarbamylsulfenamides have particular utility as accelerators in the vulcanization of unsaturated polymers. Examples of such polymers are natural rubber; diene rubbers such as polybutadiene, polyisoprene, and the like; ethylenepropylene-diene polymers where the diene is 1,4-hexadiene, dicyclopentadiene, ethylidene norbornene, and the like; diene/styrene polymers and diene/acrylonitrile polymers; and polymers in general that have carbon-carbon unsaturation capable of being crosslinked with sulfur.

The compounds are normally used in combination with a vulcanizing agent such as sulfur or a primary sulfur donor such as the thiuram disulfides. They are added to the polymer using internal mixers such as banburys or using two-roll mills and the like. The compounds are used in levels from about 0.05 part to about 7 parts by weight based upon 100 parts by weight of the polymer, and more preferably from about 0.3 part to about 5 parts by weight.

The polymers typically contain other ingredients which are added in a manner similar as the curing agents. These ingredients are fillers such as carbon blacks, clays, silicas, carbonates, and the like; lubricants and plasticizers; antioxidants and stabilizers; and the like.

The following examples serve to more fully illustrate the invention.

EXAMPLE I

N,N,N',N'-tetramethylthiocarbamylsulfenamide was prepared by reacting 0.2 mole of dimethyl-chloroamine with 0.1 mole of sodium trithiocarbonate in a medium of water and carbon tetrachloride.

The dimethyl-chloroamine was prepared by adding 36 grams of a solution of dimethylamine at 25% by weight in water (0.2 mole) to 200 milliliters of a solution of sodium hypochlorite at 10% by weight in water (0.28 mole). Reaction temperature was $0°-10°C.$, and reaction time was 15 minutes. The dimethyl-chloroamine was insoluble in the water and separated out of the aqueous solution. It was decanted off and dissolved in 50 milliliters of carbon tetrachloride.

The sodium trithiocarbonate was prepared by dissolving 8 grams (0.11 mole) of sodium sulfide, $Na_2S$, in water and adding 8 grams (0.11 mole) of carbon disulfide. The mixture was kept at room temperature for about 48 hours. The product was soluble in the water.

The sodium trithiocarbonate solution, containing about 15 grams (0.1 mole) of $Na_2CS_3$, was placed in a reactor vessel equipped with a high speed agitator. The dimethyl-chloroamine solution, containing about 16 grams (0.2 mole) of the chloroamine, was added and the mixture agitated. The temperature of the reaction was 0°–10°C., and the reaction time was 15 minutes.

The reaction mix was filtered, removing about 2 grams of sulfur. The non-aqueous phase was separated out and the carbon tetrachloride evaporated off by heating under reduced pressure. The compound obtained was white crystals having a melting point of 50°–51°C. The weight recovered was 13.8 grams, reflecting a yield of 84% of the theoretical yield of 0.1 mole. The compound was identified by its infra-red (IR) spectrum.

EXAMPLE II

N,N'-di-(oxydiethylene)thiocarbamylsulfenamide was prepared by reacting 0.2 mole of oxydiethyleneamine chloride with 0.1 mole of sodium trithiocarbonate in a medium of water and chloroform.

The oxydiethyleneamine chloride was prepared by adding 17.4 grams (0.2 mole) of oxydiethyleneamine (morpholine) to a mixture of 200 milliliters of a solution of sodium hypochlorite at 8.8% by weight in water (0.25 mole) and 50 milliliters of chloroform. The mixture was agitated for 10 minutes while keeping the temperature at 0°–10°C. After the reaction the chloroform phase was decanted off.

The chloroform phase, containing about 24 grams (0.2 mole) of oxydiethyleneamine chloride was placed into a reactor vessel equipped with a high speed agitator. 150 milliliters of an aqueous solution of sodium trithiocarbonate, containing about 27 grams (0.22 mole) of $Na_2CS_3$, was added and the mixture agitated. The temperature rose to 28°C. but was then cooled to about 12°C. where it was maintained for 10 minutes.

After the reaction the non-aqueous phase was separated out and placed in a flask with 20 grams of anhydrous $CaCl_2$ for 20 minutes. The $CaCl_2$ was filtered out and the chloroform evaporated off by heating under reduced pressure. The product obtained was off-white crystals in the amount of 16.5 grams, reflecting a yield of 76% of theoretical. The crystals were dissolved in and precipitated from hexane by cooling. The melting point was determined to be 138°C. The compound was identified by its IR spectrum and by nuclear magnetic resonance (NMR).

Using the procedures as given in Examples I and II, the following compounds were prepared:

| | M.P.[1] (°C.) | Yield[2] |
|---|---|---|
| N,N,N',N'-tetramethylthiocarbamylsulfenamide | 50–51 | 84 |
| N,N'-di-(tetramethylene)thiocarbamylsulfenamide | 84–85 | 55 |
| N,N'-di-(pentamethylene)thiocarbamylsulfenamide | 101–102 | 77 |
| N,N'-di-(hexamethylene)thiocarbamylsulfenamide | 36 | 44 |
| N,N'-di-(oxydiethylene)thiocarbamylsulfenamide | 138 | 76 |
| N,N'-di-(3,5-dimethyloxydiethylene)thiocarbamylsulfenamide | 118–120 | 48 |

[1] crystalline melting point
[2] percent of theoretical yield, after recrystallization Although these examples are drawn to the preparation of symmetrical compounds, the use of two different monochloroamines in the reaction produces unsymmetrical thiocarbamylsulfenamides.

EXAMPLE III

N,N'-di(oxydiethylene)thiocarbamylsulfenamide was prepared by reacting about 0.2 mole of oxydiethyleneamine chloride with about 0.1 mole of sodium tetrathiocarbonate in a medium of water and chloroform.

The oxydiethyleneamine chloride was prepared by adding 17.4 grams (0.2 mole) of oxydiethyleneamine (morpholine) to a reactor vessel containing 50 milliliters of chloroform and 200 milliliters of a solution of sodium hypochlorite at 13.1% by weight in water (0.38 mole). The mixture was agitated for 15 minutes at a temperature of about 10°C. The chloroform layer was then separated out.

The sodium tetrathiocarbonate was prepared by admixing 240 grams (1.0 mole) of sodium sulfide ($Na_2S \cdot 9H_2O$) and 32 grams (1.0 mole) of sulfur in 652 grams of water followed by the addition of 76 grams (1.0 mole) of carbon disulfide. The reaction was kept at room temperature for about 6 hours by which time the sulfur had dissolved. The solution was 1.0 mole in 1000 grams.

100 grams of the aqueous sodium tetrathiocarbonate solution (containing about 0.1 mole of thiocarbonate) was added to a reactor vessel equipped with a high speed agitator. The oxydiethyleneamine chloride solution prepared above (containing about 0.2 mole of the amine chloride) was added and the mixture stirred for 35 minutes at a temperature of 10°C. to 20°C.

The non-aqueous phase was then separated out and the chloroform evaporated off under reduced pressure. 23.4 grams of a yellow solid was obtained. The material was dissolved in methanol, filtered to remove the undissolved solids, and the filtrate cooled in dry ice to precipitate out the compound. 20.1 grams of product having a melting point of 124°–126°C. was obtained. This reflects a yield of 81% by weight of the theoretical yield. The product was identified through its IR spectra.

The reaction using the tetrathiocarbonate salt proceeds the same as that using the trithiocarbonate salt, the only difference being in the amount of sulfur byproduct formed.

EXAMPLE IV

Thiocarbamylsulfenamides are useful as accelerators for the vulcanizataion of unsaturated polymers. The N,-N'-di-(oxydiethylene)thiocarbamylsulfenamide prepared in Example II was evaluated as an accelerator in the sulfur cure of a styrene-butadiene rubber, sold commercially as Ameripol 1502. The following recipe was used:

| | Parts by Weight |
|---|---|
| SBR 1502 | 100 |
| HAF black | 50 |
| Stearic acid | 3 |
| Zinc oxide | 5 |
| Sulfur | 2 |
| Accelerator | 1 |

The ingredients was incorporated into the rubber using a two-roll mill. The rubber was sheeted, cut, and presscured for 26 minutes at 302°F. The vulcanizate had a 2825 psig tensile and an elongation of 270 percent.

In addition to SBR rubber, the compound was a useful accelerator in the cure of natural rubber, polybutadiene, and an ethylene-propylene-diene polymer.

I claim:

1. A process for the preparation of thiocarbamylsulfenamides comprising the reaction of, as the only reactants, (1) a monohaloamine(s) of the formula X—A wherein X is selected from the group consisting of —Cl, —Br, and —I, and A is selected from the group consisting of

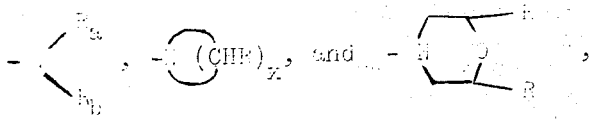

wherein $R_a$ and $R_b$ are selected from the group consisting of -H, alkyl having 1 to 24 carbon atoms, cyanoalkyl having 2 to 12 carbon atoms, alkoxyalkyl having 2 to 12 carbon atoms, cycloalkyl having 4 to 8 carbon atoms in the ring, phenyl, and aralkyl or alkaryl having up to 18 carbon atoms; and where $x = 4$ to 7, and R is selected from the group consisting of hydrogen and alkyl having 1 to 2 carbon atoms, and (2) a thiocarbonate salt of the formula $M_zCS_y$, wherein M is selected from the class consisting of alkali metals, alkaline earth metals, and an ammonium salt of the formula $—N(R')_4$ where R' is —H, alkyl having 1 to 8 carbon atoms, or mixtures thereof, $Z = 1$ to 2, and y is 3 or 4.

2. A process of claim 1 wherein the monohaloamine is slurried in a water solution of the thiocarbonate salt.

3. A process of claim 2 wherein the monohaloamine is dissolved in a chlorinated organic solvent selected from the group consisting of carbon tetrachloride, chloroform, ethylene dichloride, and 1,1,2-trichloroethane.

4. A process of claim 3 wherein when A is

$R_a$ and $R_b$ are selected from the group consisting of hydrogen and alkyl having 1 to 24 carbon atoms, and when A is

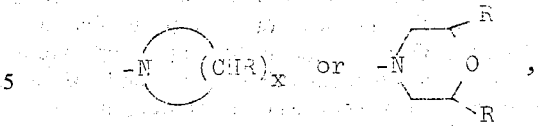

$x$ is 4 to 7 and R is hydrogen or methyl or ethyl.

5. A process of claim 4 wherein the monohaloamine is dissolved in an organic solvent selected from the group consisting of carbon tetrachloride, chloroform, dichloroethylene, and 1,1,2-trichloroethane and this non-aqueous solution is admixed with an aqueous solution of said thiocarbonate salt in water.

6. A process of claim 5 where in the thiocarbonate salt, M is an alkali metal and $z = 2$.

7. A process of claim 6 wherein —X of said monohaloamine is -Cl, and the thiocarbonate salt is sodium trithiocarbonate or sodium tetrathiocarbonate.

8. A process of claim 7 wherein the monochloroamine is selected from the group consisting of dimethylchloroamine, oxydiethyleneamine chloride, tetramethyleneamine chloride, pentamethyleneamine chloride, hexamethyleneamine chloride, and 3,5-dimethyl oxydiethyleneamine chloride.

9. A process of claim 1 wherein the monohaloamine is used at the level of essentially two moles of monohaloamine to every one mole of thiocarbonate salt present.

10. A process of claim 1 wherein the monohaloamine is prepared in situ, prior to the reaction between the monohaloamine and the thiocarbonate salt, by reacting a primary or secondary amine with sodium hypochlorite.

11. A process for the preparation of a thiocarbamylsulfenamide comprising the reaction of, as the only reactants, (1) 0.2 mole of oxydiethyleneamine chloride and (2) 0.1 mole of sodium trithiocarbonate, at a temperature of from 0°C. to 28°C., wherein the said oxydiethyleneamine chloride is employed as a solution in chloroform and the said sodium trithiocarbonate is employed as a solution in water.

* * * * *